April 23, 1963　　　J. P. BARGER ET AL　　　3,086,372
HEAT EXCHANGE MEANS FOR SPACE VEHICLES
Filed Feb. 19, 1960
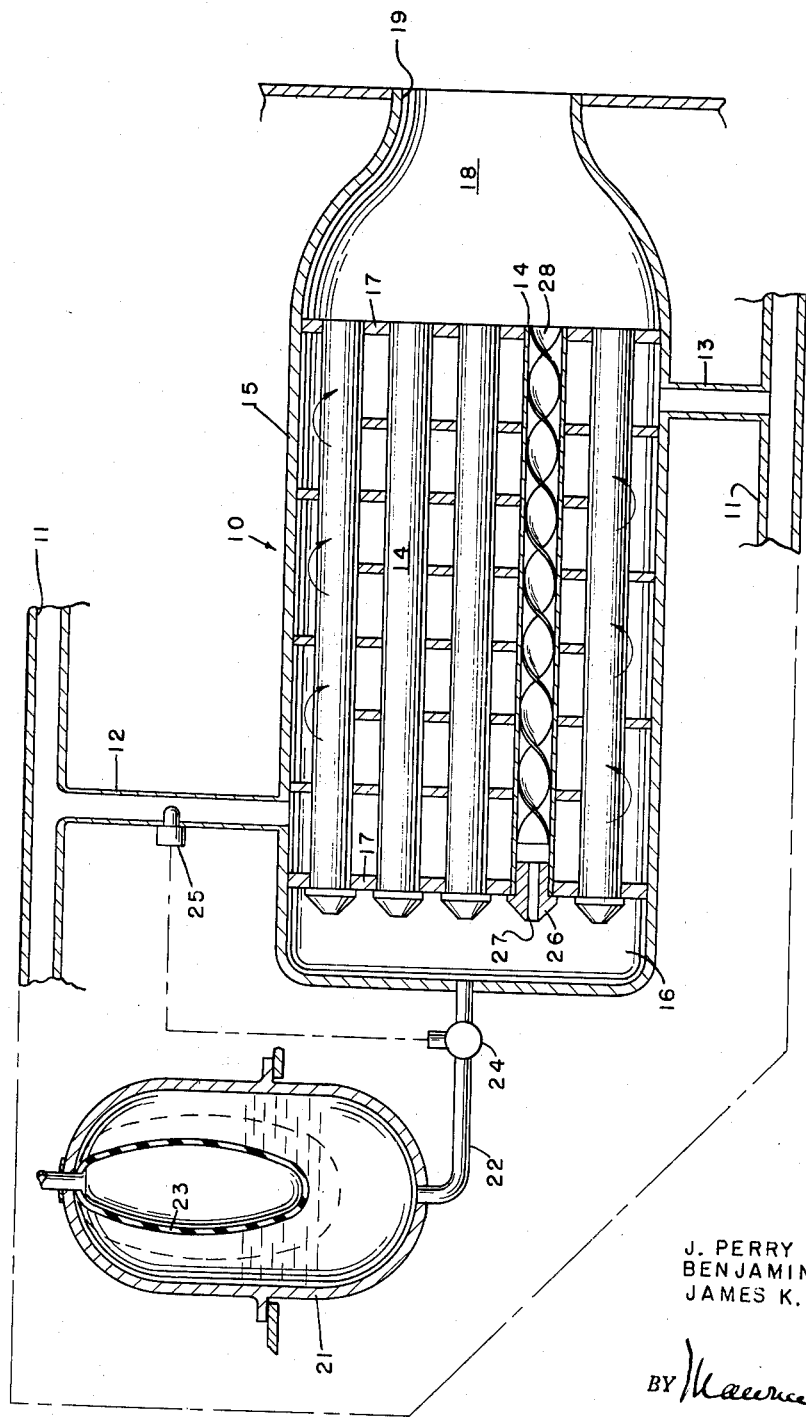
J. PERRY BARGER
BENJAMIN F. LOVE
JAMES K. SPARRELL
　　　　INVENTORS
BY /Maurice W. Grady
ATTORNEY

United States Patent Office 3,086,372
Patented Apr. 23, 1963

3,086,372
HEAT EXCHANGE MEANS FOR SPACE VEHICLES
J Perry Barger, Arlington, Mass., Benjamin F. Love, Scotia, N.Y., and James K. Sparrell, Marblehead, Mass., assignors to Alco Products, Incorporated, New York, N.Y., a corporation of New York
Filed Feb. 19, 1960, Ser. No. 9,754
3 Claims. (Cl. 62—222)

This invention relates to space vehicles.

One of the problems confronting designers of outer space vehicles is how to dissipate the high heat generated by the friction to which the vehicle is subjected in penetrating the earth's atmosphere upon returning from outer space. One means by which such dissipation can be effected is to provide for the circulation of a coolant through the vehicle skin and structure during its passage through the atmosphere. To maintain this coolant at working temperature, a heat exchanger of the shell and tube type suggests itself. It is proposed to arrange such a heat exchanger within the vehicle so that the coolant will pass through it as the shell side fluid to be cooled by the evaporation of water which is supplied to the tubes under pressure. The water will pass from the header, where it is maintained under pressure, through the tubes and exhaust in the pure vapor state outside the vehicle. In the outer fringes of the atmosphere where operation of the heat exchanger will take place, the pressure in the space into which the tubes exhaust will approximate zero. Because of dimensional limitations and payload requirements of the vehicle, it is obvious that the amount of water carried by the vehicle must be minimal and that any heat exchange apparatus of the type described must be designed in view of such limitations and requirements.

The principal object of this invention is to provide a novel and compact heat exchanger to maintain at a suitable temperature a coolant fluid circulated through the skin and structure of an outer space vehicle during its re-entry into planetary atmosphere from outer space.

Another object is to provide such a heat exchanger of the shell and tube type in which the coolant circulating through the skin and structure of an outer space vehicle will be passed through the heat exchanger as the shell side fluid and cooled by heat exchange with the fluid in the tubes.

Another object is to provide a heat exchanger as described in which the fluid passing through the tubes is vaporized by the heat dissipated from the skin and structure of the space vehicle and exhausted overboard to outer space.

Another object is to provide a heat exchanger as described in which the shell and tube fluids are passed in parallel flow but produce a temperature distribution in the manner of the conventional counterflow heat exchanger.

A still further object is to provide such a heat exchanger in which the quantity of fluid passing through the tubes is regulated by a valve responsive to the temperature of the shell side fluid which compensates for any fluctuations in upstream and downstream pressure.

A further object is to provide such a heat exchanger in which the fluid passing from the header into the tubes undergoes a pressure drop to initiate the process of vaporization.

A further object is to provide such a heat exchanger in which the length of the tube is carefully predetermined in relation to the velocity and corresponding pressure drop of the fluid as it passes through the tube so that the fluid exists in the pure vapor state, thus absorbing its total latent heat of vaporization from the shell fluid.

Another object is to provide a heat exchanger as described in which the tubes are provided with internal spiral means to guide the fluid passing through the tubes in a spiral flow path, thus creating a centrifugal force field several times the force of the earth's gravity field to enable the liquid content of the vaporizing fluid to be separated from the vapor content and forced against the inside heat transfer surface of the tube under a zero gravity environment for improved heat exchange with the shell side fluid.

Another object is to provide a heat exchanger as described in which the overall pressure drop of the fluid passing through the tubes and exhausting overboard is such that the fluid reaches substantially sonic velocity at the exit.

A still further object is to provide such a heat exchanger in which the temperature of the tube fluid is sufficiently above the freezing point to prevent any clogging of the exhaust by formation of ice or snow.

Other and further objects will be apparent from the following description, the accompanying drawing, and the appended claims.

In the drawing, there is illustrated a schematic representation in cross section of the present invention illustrating only a portion of the skin or structure of the vehicle.

Referring now to the drawing, the invention comprises essentially a shell and tube type heat exchanger, generally indicated as 10, located within a space vehicle, the outer vehicle structure or skin 11 is illustrated only by fragmented portions. The vehicle skin and structure is cooled by a coolant, such as an aqueous solution of propylene glycol, which flows through a system or network of passages (not illustrated) distributed throughout the skin and structure and including passage 12. From passage 12 the coolant flows into the heat exchanger as the shell side fluid to be cooled therein and returned through pipe 13 to the skin network for recirculation. Another fluid, preferably water, which reduces the shell side coolant to a suitable temperature, is passed through the tubes 14 in heat exchange relation with the coolant and in a novel manner particularly adaptable to the environment and conditions in which the vehicle is intended to operate. The source of the skin coolant and means to circulate it through the network of passages in the skin can be conventional and need not be illustrated.

Comment should be made at this point as to environmental conditions. Once the vehicle noses toward the earth, its deceleration will be greatest as it enters the outer fringes of the atmosphere at a height of about 30 miles. The invented structure will be in operation at that stage of its travel and as the vehicle continues toward the earth through the increasingly denser atmosphere, its velocity will be diminished by rocket braking and by the friction with the atmosphere. As the vehicle proceeds through the atmosphere, it will be heated by the friction of the atmosphere with the skin. Under these conditions a closely regulated flow of coolant will be required to meet the varying thermal conditions of the skin and structure.

Heat exchanger 10 includes a shell 15, a header 16, and a set of tubes 14 extending axially within the shell. The tubes are supported at their opposite ends by a pair of spaced tube sheets 17 and serve to establish a flow path between header 16 and a discharge chamber 18, which exhausts through outlet 19 into the space outside the vehicle.

Tube side fluid, which is preferably water, is stored under a predetermined pressure (approximately 14 p.s.i.) and at a controlled temperature (approximately 80°) within tank 21 which is connected to the header 16 by pipe 22. Such fluid will be pressurized by conventional means, which need not be illustrated, and the pressure is maintained constant by bladder 23 located within tank 21. A temperature responsive pressure modulated valve 24 in pipe 22 regulates the flow of fluid supplied to the header, said valve being controlled by temperature sensing device 25 arranged in pipe 12 adjacent to the inlet of the heat exchanger. Stated otherwise, when the temperature of the coolant in pipe 12 reaches a selected level, device 25 will function to operate valve 24 to permit the flow of pressurized fluid from tank 21 to header 16 at predetermined pressure.

A metering plug 26, positioned within the inlet end of each tube 14, projects into header 16 and has a small precise flow passage 27 designed to provide a pressure drop between the header and tube sufficient to cause a small percentage of the liquid in the header to flash into vapor as it enters the tube. Pressure of the fluid in tube 14 adjacent passage 27 will be less than 0.5 p.s.i. A helical strip 28 disposed within each tube 14 creates an artificial gravity field imparting a centrifugal force to the liquid-vapor mixture passing through the tubes so that the liquid entrained in the vapor will be thrown against the inside wall of the tubes to effect improved heat transfer with the shell side fluid. As the liquid-vapor mixture progresses through the tubes, there is a decrease in its pressure and boiling temperature with a corresponding increase in vapor and in the volume and velocity of the mixture. As designed for maximum flow rate through the tubes in pounds per hour, the fluid should leave the outlet as pure saturated vapor at substantially sonic velocity. Maximum heat absorption by the fluid passing through the tubes is thus effected.

In operation, when the temperature of the vehicle coolant reaches a predetermined level upon entry into planetary atmosphere, sensing device 25 functions to operate valve 24 which permits the flow of water from tank 21 into the header 16 at a controlled pressure. From the header the water passes into tubes 14 through flow passages 27 in plugs 26. Since the pressure in the tubes immediately adjacent to passages 27 is less than 0.5 p.s.i. and the temperature of the water is approximately 80°, a small percentage of the water is flashed into vapor. As this liquid-vapor mixture progresses along the tubes, the entrained liquid is thrown against the inside wall of the tubes, as previously described, in heat exchange relation with the coolant or shell side fluid, and is progressively vaporized along the length of the tubes. The pressure of the atmosphere outside the vehicle opposite the heat exchanger outlet 19 is substantially zero; hence there is a decrease in pressure and temperature of the liquid-vapor mixture as it progresses along the length of the tubes with a corresponding increase in vapor and in the volume and velocity of the mixture. The temperature of the vapor at the discharge end of the tubes is approximately 47° at 0.15 p.s.i. Thus, although the fluids are passed in parallel flow heat exchange relation and in the same direction toward the outlet end of the unit, a temperature distribution in the manner of the conventional counterflow heat exchanger is achieved. It should be noted that the length of the tube 14 is calculated so that the vapor leaves the tubes at substantially sonic velocity.

While there has been hereinbefore described an approved embodiment of this invention, it will be understood that many and various changes and modifications in form, arrangement of parts and details of construction thereof may be made without departing from the spirit of the invention, and that all such changes and modifications as fall within the scope of the appended claims are contemplated as a part of this invention.

What we claim is:

1. A heat exchanger of the shell and tube type for controlling the temperature of a coolant circulated through the skin coolant system of a space vehicle comprising a shell, an inlet to and an outlet from the shell in communication with the skin coolant system to provide for the circulation of the skin coolant through the shell as the shell side fluid; a pair of spaced tube sheets within the shell; a closed chamber adjacent one tube sheet; a chamber adjacent the opposite tube sheet opening into the space outside the vehicle; a plurality of tubes of predetermined length extending between the tube sheets establishing communication between the closed chamber and the opposite open chamber; a container to store a cooling fluid; means to maintain the fluid in the container at a predetermined pressure; fluid passage means between the container and the closed chamber; a control valve in the fluid passage means; sensing means responsive to the temperature of the skin coolant system to operate said valve to control the flow of cooling fluid from said container to the closed chamber; and a metering orifice in each tube adjacent the closed chamber to provide for the flow of cooling fluid from the closed chamber to the tubes, the arrangement of the parts being such that the cooling fluid maintained at a predetermined pressure in said container and delivered to the metering orifices undergoes a pressure drop in passing through the orifices sufficient to initiate vaporization of the fluid at its ambient temperature as it passes into the tubes, the cross sectional area of each tube and its length being such that the vaporization of the fluid is completed and the product is moving at sonic velocity at the tube outlet.

2. A heat exchanger, according to claim 1, in which each tube is provided with helical means which imparts a centrifugal force to the liquid-vapor mixture thus to throw the liquid against the inside wall of the tube to effect heat transfer to the shell side fluid.

3. A heat exchanger of the shell and tube type for reducing the temperature of a fluid circulated through the exchanger comprising a shell; an inlet to and an outlet from the shell disposed on opposite ends thereof to provide for the circulation of the fluid through the shell; a pair of spaced tube sheets within the shell; a closed chamber adjacent one tube sheet on the end of the shell having the inlet for the shell fluid; a chamber adjacent the opposite tube sheet opening into the ambient; a plurality of tubes of predetermined length extending between the tube sheets establishing communication between the closed chamber and the opposite open chamber; a container to store a cooling fluid; means to maintain the fluid in the container at a predetermined pressure; fluid passage means between the container and the closed chamber; a control valve in the fluid passage means; and a metering orifice in each tube adjacent the closed chamber to provide for the flow of cooling fluid from the closed chamber to the tubes, the arrangement of the parts being such that the cooling fluid maintained at a predetermined pressure in the container and delivered to the metering orifices undergoes a pressure drop in passing through the orifices sufficient to initiate vaporization of the fluid at its ambient temperature as it passes into the tubes and to cause complete vaporization of the fluid as it passes along the length of the tubes in heat exchange relation with the shell side fluid.

References Cited in the file of this patent

UNITED STATES PATENTS

| | | |
|---|---|---|
| 737,562 | Atkins | Sept. 1, 1903 |
| 1,760,505 | Lea | May 27, 1930 |
| 2,083,611 | Marshall | June 15, 1937 |
| 2,085,186 | Eger | June 29, 1937 |
| 2,158,792 | Erbach | May 16, 1939 |
| 2,247,850 | Rayburn | July 1, 1941 |
| 2,479,821 | Deutsch et al. | Aug. 23, 1949 |
| 2,581,121 | McCurdy et al. | Jan. 1, 1952 |
| 2,900,808 | Wesan Wang | Aug. 25, 1959 |
| 2,925,722 | Blackburn | Feb. 23, 1960 |
| 2,964,917 | Webster | Dec. 20, 1960 |